United States Patent [19]

Furuta

[11] Patent Number: 4,639,917
[45] Date of Patent: Jan. 27, 1987

[54] FAULT DETERMINING APPARATUS FOR DATA TRANSMISSION SYSTEM

[75] Inventor: Michihiro Furuta, Hyogo, Japan

[73] Assignee: Mitsubishi Denki Kabushiki Kaisha, Tokyo, Japan

[21] Appl. No.: 623,705

[22] Filed: Jun. 22, 1984

[30] Foreign Application Priority Data

Jun. 24, 1983 [JP] Japan ................................ 58-114608

[51] Int. Cl.⁴ .......................................... G06F 11/00
[52] U.S. Cl. ...................................... 371/16; 371/10; 371/5; 371/49
[58] Field of Search ...................... 371/15, 16, 49, 38, 371/10, 5, 18; 364/200, 900

[56] References Cited

U.S. PATENT DOCUMENTS

| | | | |
|---|---|---|---|
| 3,805,038 | 4/1974 | Buedel | 371/18 |
| 3,906,200 | 9/1975 | Petschauer | 371/10 |
| 3,917,933 | 11/1975 | Scheuneman | 371/10 |
| 3,999,051 | 12/1976 | Petschauer | 371/10 |
| 4,025,767 | 5/1977 | Bottard | 371/16 |
| 4,205,370 | 5/1980 | Hirtle | 364/200 |
| 4,245,344 | 1/1981 | Richter | 371/49 |
| 4,312,066 | 1/1982 | Bantz | 371/16 |
| 4,326,291 | 4/1982 | Marsh | 371/49 |
| 4,371,949 | 2/1983 | Chu | 371/38 |
| 4,375,664 | 3/1983 | Kim | 371/38 |

Primary Examiner—Michael R. Fleming
Attorney, Agent, or Firm—Bernard, Rothwell & Brown

[57] ABSTRACT

A fault-determining apparatus includes parity error checking for data transferred from a main storage and an input/output unit to a CPU which has an interrupt procedure called by the detection of a parity error for recording a parity error signal in a trace recording memory along with a fault-detection signal and data transferred to a data bus from predetermined addresses of interest in the main storage and the input/output unit.

5 Claims, 4 Drawing Figures

FAULT DETERMINING APPARATUS FOR DATA TRANSMISSION SYSTEM

BACKGROUND OF THE INVENTION

1. Field of the Invention

The present invention relates to a fault determining apparatus for a data transmission system in a cyclic operating system and, particularly, to a diagnostic apparatus having an operation tracing memory.

2. Description of the Prior Art

In a conventional apparatus, some control parameters useful for diagnostic activity are registered in advance as trace information and this trace information along with detected faults for the latest few operating cycles is stored in a tracing memory so that it can be used for analyzing the faults. In such a conventional system, a parity error signal representing a faulty result of parity check is not included in the record of the tracing memory.

One major purpose of a parity check is to detect erroneous data occurring in the transmission system. However, in the absence of any parity error signal being stored in the tracing memory, no record of a fault in the data transmission system is obtained, and it is not known whether or not the data being traced is transmitted correctly. Therefore, the reliability of the traced data is unknown.

SUMMARY OF THE INVENTION

The present invention is summarized in a fault determining apparatus for a computerized operating system with a trace memory recording selected transmission and fault status wherein there is included parity checking of transmitted data from a main storage or from an input/output unit to a CPU, and the parity error status is also recording in the trace memory.

It is an object of the present invention to provide a fault determining apparatus for a data transmission system capable of overcoming the foregoing prior art deficiency.

Another object of the present invention is to provide a diagnostic apparatus capable of enhancing the reliability of diagnostic functions through the inclusion of the parity error signal in information being traced.

These and other objects and features of the present invention will become more apparent from the following detailed description taken in conjunction with the accompanying drawings.

DESCRIPTION OF THE PREFERRED EMBODIMENTS

The invention will now be described with reference to the drawings.

Figure 1:
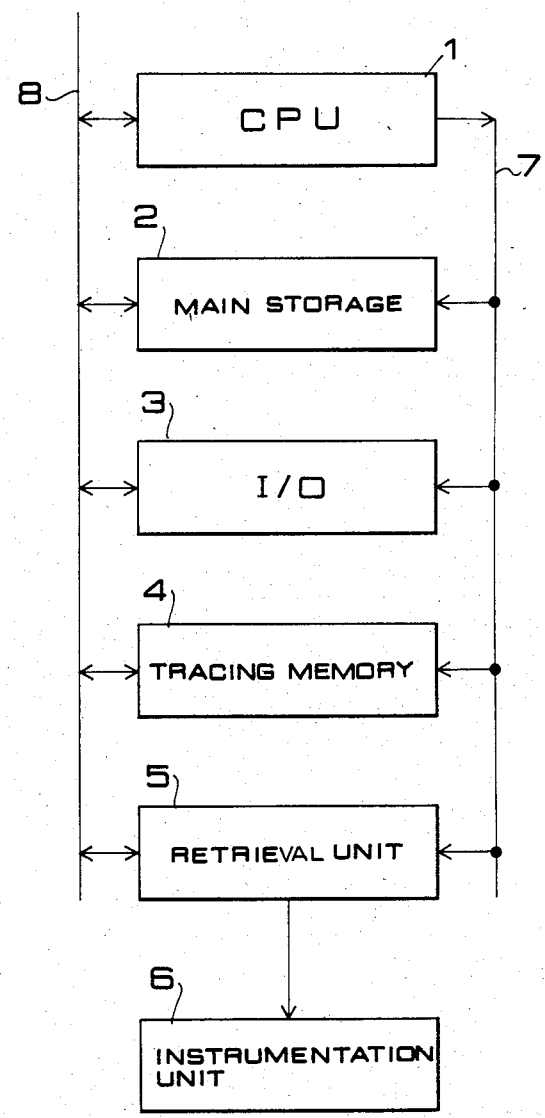
FIG. 1 is a block diagram showing the diagnostic apparatus embodying the present invention.

In FIG. 1, showing in block form one embodiment of the present invention, the apparatus includes a central processing unit (CPU) 1, a main storage 2, an input/output (I/O) unit 3, a tracing memory 4, a tracing memory retrieval unit 5, an instrumentation unit 6, an address command bus 7, and a data bus 8. The CPU 1 makes access to the main storage 2 and I/O unit 3 selectively through the address command bus 7, so that data is transferred among the CPU 1, main storage 2 and I/O unit 3 through the data bus 8. Parity information is appended to data which is transferred through the data bus 8 so that any bit error which occurs during the transfer can be detected. Information being traced is stored along with associated parity information and fault information in the tracing memory 4. The memorized information is retrieved by the tracing memory retrieval unit 5 and recorded by the instrumentation unit 6.

Figure 2:
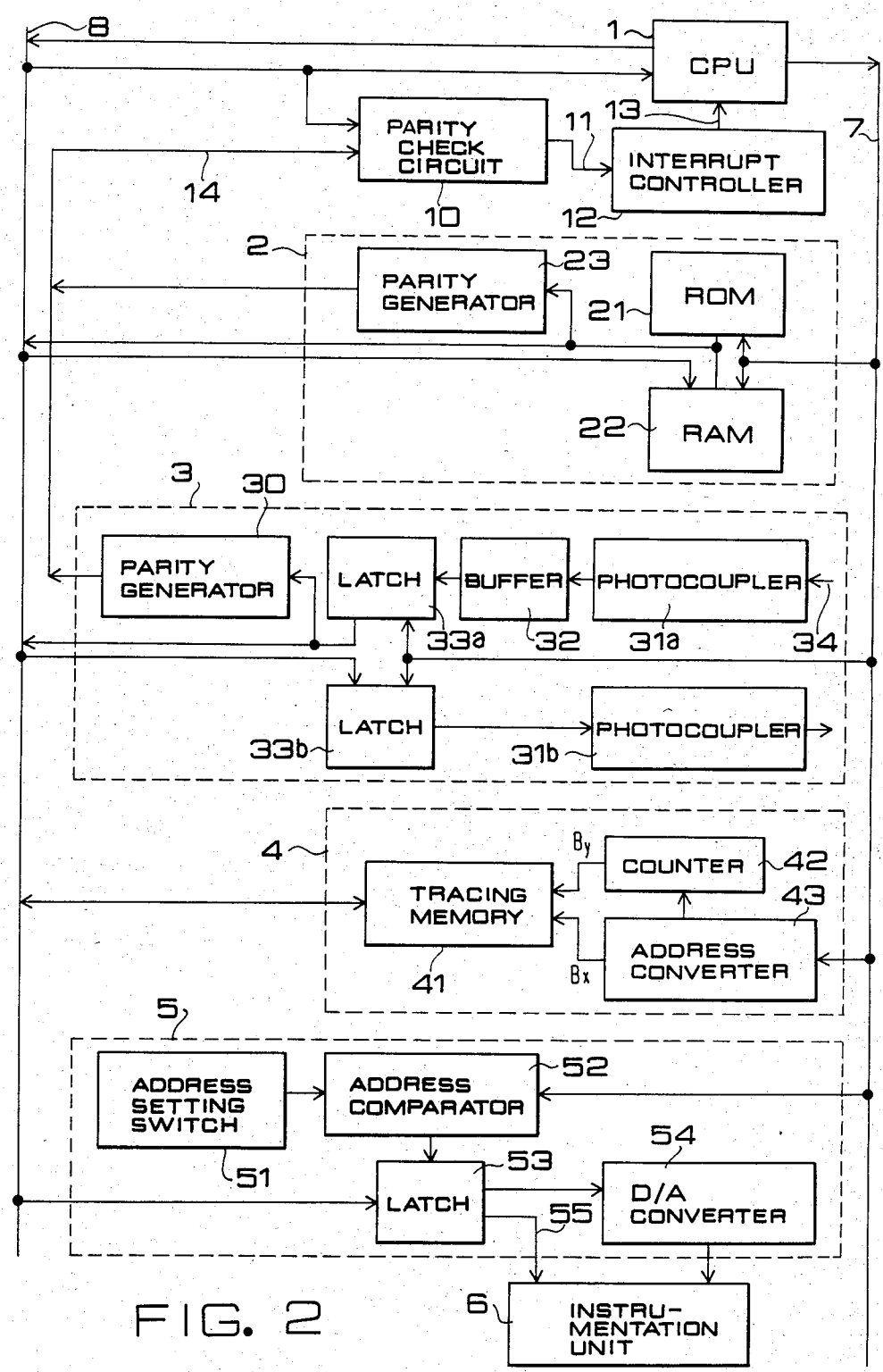
FIG. 2 is a block diagram showing in more detail the arrangement shown in FIG. 1.

FIG. 2 shows in more detail the arrangement of FIG. 1, and common reference numbers are used for counterparts of both figures. In FIG. 2, parity check circuit 10 receives data on the data bus 8 and a parity bit provided by either parity generator 23 or 30 and performs a parity check on the data transferred on bus 8. The output of the parity check circuit 10 is connected to the CPU 1 by an interrupt controller 12 which issues an interrupt request to the CPU 1 upon the occurrence of a parity error.

The above-mentioned main storage 2 is made up of ROM 21, RAM 22 and parity generator 23. The above-mentioned I/O unit 3 is made up of photocouplers 31a and 31b for providing electrical isolation to the respective input and output signals, a buffer input register 32, input and output latches 33a and 33b for holding data in accordance with signals on the address command bus 7, and the parity generator 30. The I/O unit 3 operates to send out information through the output latch 33b and photocoupler 31b receive information through the input photocoupler 31a and latch 33b.

The tracing memory 4 is made up of a memory 41 for storing tracing data, a binary counter 42 for generating part by of the address input, such as the more significant bits, for the memory 41 and an address converter 43 which receives signals on the address command bus 7 to generate the remaining part Bx of the address input, such as the lesser significant bits for the tracing memory 41 in correspondence with the successive detection of predetermined address signals on bus 7, and also to generate a pulse for advancing the count of the counter 42 upon the completion of a cycle.

The tracing memory retrieval unit 5 includes a switch 51 used to set an address corresponding to one of the predetermined source addresses of data recorded in the tracing memory, an address comparator 52 which detects the coincidence of the address signal on the address command bus 7 with the setup of the address setting switch 51, a latch 53 which holds data on the data bus 8 in response to the address coincidence signal provided by the address comparator 52, and a D/A converter 54 which converts data held in the latch 53 into an analog signal. The latch 53 also outputs its contents in multi-bit form as shown by 55. The instrumentation unit 6 operates to record the analog signal provided by the D/A converter 54 or the digital signal provided by the latch 53 directly from the tracing memory retrieval unit 5 over data bus 8.

The operation of the embodiment will be described in detail. When the CPU 1 makes access to the main storage 2 for reading data, the parity generator 23 within the main storage 2 fetches data on the data bus 8, generates a parity bit of the even or odd parity mode, and appends the parity signal to a parity bit line 14 of the data bus 8, and then the stored data with a parity signal appended thereto is transferred to the CPU 1 and parity check circuit 10. When the CPU 1 makes access to the I/O unit 3 for reading incoming data, the incoming signal 34 is read in through the photocoupler 31a and buffer 32, and it is held in the latch 33a in accordance with the signal on the address command bus 7. The parity generator 30 receives data from the latch 33a on the data bus 8, generates a parity bit of even or odd parity mode, and appends the parity signal 14 to the data. Then the incoming data with the parity signal appended thereto is transferred to the CPU 1 and parity check circuit 10.

Accordingly, when the CPU 1 reads data from the main storage 2 or I/O unit 3, the parity signal 14 is transferred along with data to the parity check circuit 10 which performs a parity check of the data bits read out from the main storage or I/O unit with the parity signal 14. If a parity error is detected as a result of the parity check, a parity error signal 11 is delivered as an interrupt request signal to the interrupt controller 12, which in turn issues an interrupt request to the CPU 1. The CPU 1 causes the program to branch to a preprogrammed interrupt routine, which sets the data being stored in the tracing memory memory for indicating a parity error along with the predetermined conventional trace information including the data bits on bus 8 and the logical state of a fault detection signal.

The trace function is designed to store tracing data in predetermined addresses in the tracing memory 41 without affecting the operation of the control system when the CPU 1 makes access to the main storage and I/O unit for the control operation. By means of the parity check circuit and the interrupt procedure, the parity error signal is also stored in the tracing memory.

The following describes the retrieval of tracing data stored in the tracing memory 41. The CPU 1 executes a preprogrammed trace retrieval program to retrieve data in the tracing memory 41 corresponding to data from a predetermined address. The source address of data associated with a fault detected by conventional means is set in advance on the address setting switch 51 in the tracing memory retrieval unit 5. The address comparator 52 operates to detect the coincidence of the address on the address bus 7 for the trace data provided by the CPU 1 with the address set on the address setting switch 51, and data on the data bus 8 is latched when the coincidence is detected. The latched data is transferred as multi-bit signals 55 or converted into an analog signal by the D/A converter 54 and transferred to the instrumentation unit 6, which then records the tracing data.

Figure 3:
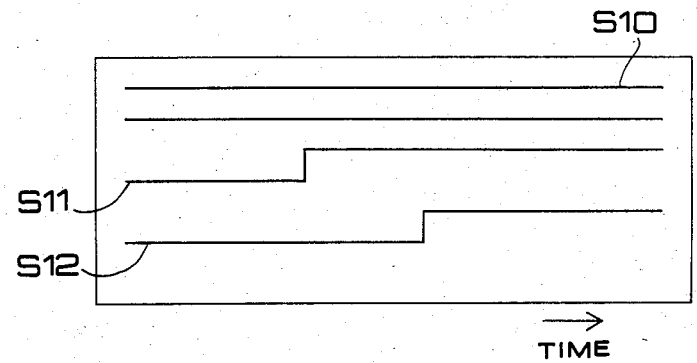
FIGS. 3 and 4 are charts showing examples of record logged by the instrumentation unit shown in FIG. 1.
Figure 4:
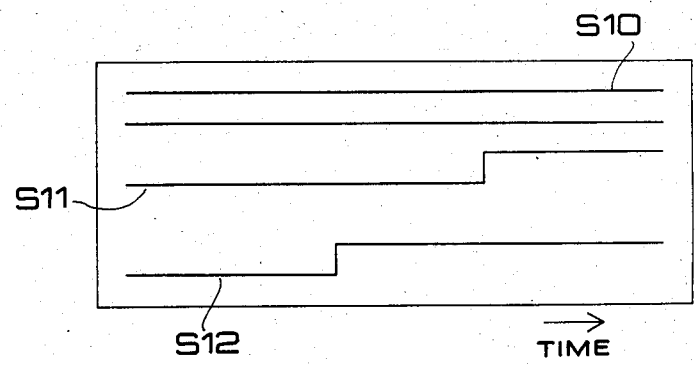

FIGS. 3 and 4 show data charts recorded by the instrumentation unit 6. Each chart includes the record of a signal under trace S10, a fault detection signal S11 and a parity error signal S12. In the case of FIG. 3, the parity error is detected after the fault has been detected, while in the case of FIG. 4, the fault is detected after the parity error has been detected.

Namely, in the case of FIG. 3, it can be said that the fault detection signal itself has not been detected erroneously and the traced signal itself is reliable. Whereas, in the case of FIG. 4, it can be considered that the fault detection signal has been detected erroneously and the traced signal at the time of parity error detection could differ from the actual signal.

These diagnoses, which have not been possible in the conventional fault tracing system, are made possible by the foregoing embodiment through the provision for storing the parity error signal in the tracing memory 4.

Accordingly, the present invention can effectively enhance the reliability of fault analysis through the inclusion of the parity error signal in signals under trace.

What is claimed is:

1. A fault determining apparatus for a data transmission system having a central processing unit (CPU) which transfers data to and from a main storage and an input/output unit through a data bus in accordance with information on an address command bus, said apparatus comprising:

parity generating means in each of said main storage and said input/output unit for generating and appending a parity bit to the data bus upon transfer of data bits from the respective main storage and input/output unit to the data bus, parity checking means associated with the CPU and connected to the data bus for receiving the data bits and the parity bit and for generating a parity error signal when the parity of the received data bits does not correspond to the received parity bit, a trace memory means connected to the data bus and the address command bus and including addressing means responsive to detection of predetermined signals on the address command bus for storing trace information of data received by said CPU from said main storage and said input/output units over a predetermined duration and for storing a transitional record of the logical state of a fault detection signal and the parity error signal from the parity checking means along with the stored data;

trace memory retrieval means for retrieving information stored in said trace memory means corresponding to stored data from a selected source address of said main storage and said input/output means along with the corresponding stored transitional record of the fault detection signal and the parity error signal; and means for generating a record of said data transmission system based on said retrieved data and transitional record of said fault detection signal and said parity error signal retrieved by said trace memory retrieval means.

2. An apparatus according to claim 1, wherein said main storage comprises a random access memory (RAM) and a read-only memory (ROM) connected to the data bus and the address command bus along with the parity generating means for the main storage for generating and transferring the data bits and the parity bit to the data bus when the address command bus calls for transfer of data from an address in said RAM or ROM.

3. An apparatus according to claim 1, wherein said input/output unit comprises an input photocoupler, a buffer register connected to the output of the photocoupler, and a latch register connected to the buffer register and the address command bus for applied input data bits to the data bus and the parity generating means of the input/output means.

4. An apparatus according to claim 1, wherein said trace memory means comprises a trace memory connected to the data bus, an address converting circuit connected to the address command bus for detecting predetermined address signals to generate lesser significant address bits for the trace memory in correspondence to accessing by the CPU of selected addresses of interest called for at steps within a cyclic operating procedure, a counter stepped at completion of each cyclic operating procedure to generate greater significant address bits for the trace memory corresponding to successive cycles of operation.

5. An apparatus according to claim 1, wherein said memory retrieval means comprises an address setting switch, an address comparator having inputs connected to the address setting switch and the address command bus, a latch register responsive to the address comparator and connected to the data bus for receiving the retrieved data and transitional record, and a D/A converter connected to the latch output for generating an analog signal to operate the record generating means.

* * * * *